Oct. 12, 1971 G. H. BJORK 3,611,714
POLLUTION REDUCING MUFFLER
Filed Sept. 29, 1969
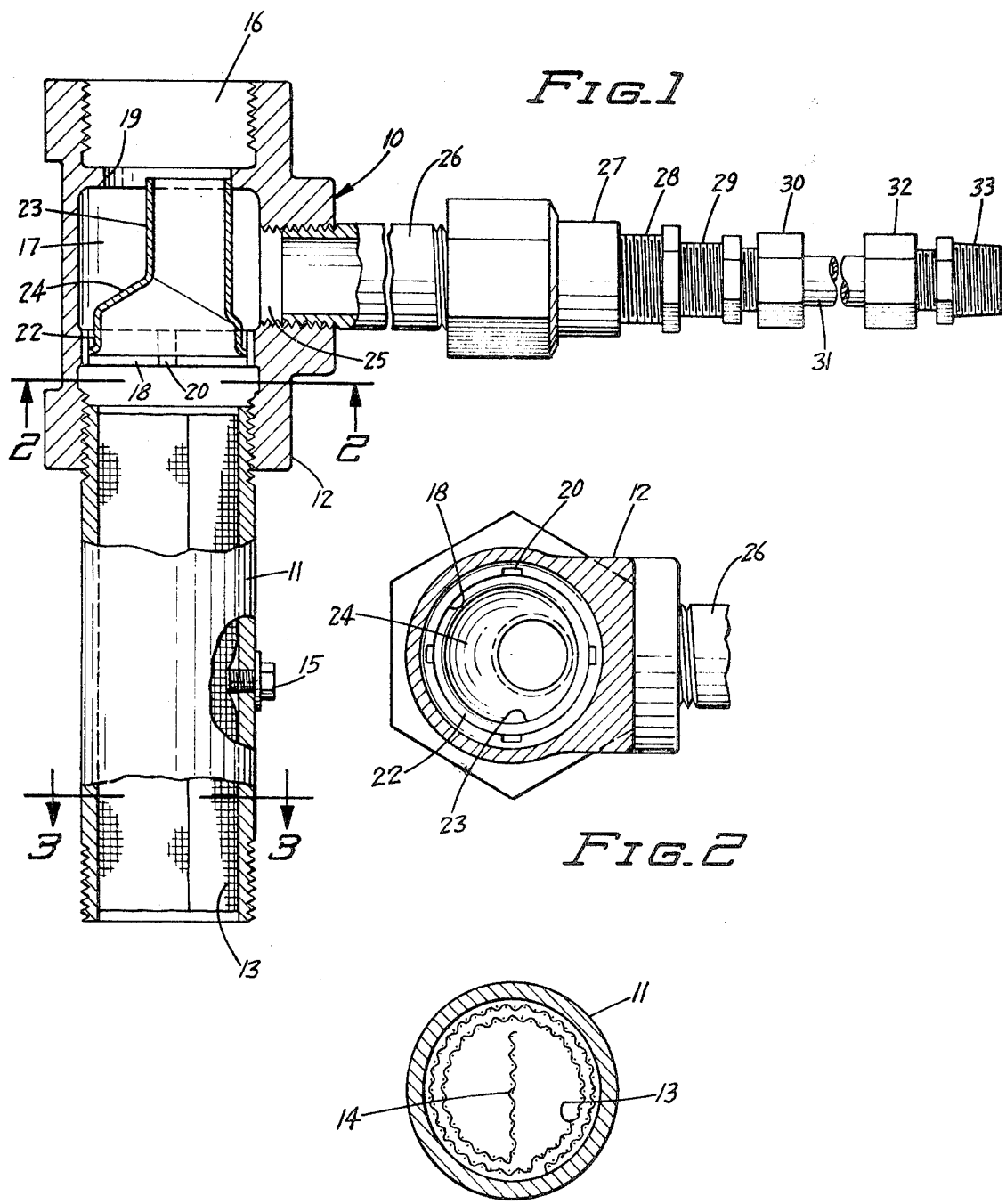
INVENTOR.
GUST H. BJORK
BY
*Burd, Braddock & Bartz*
ATTORNEYS

United States Patent Office 3,611,714
Patented Oct. 12, 1971

3,611,714
POLLUTION REDUCING MUFFLER
Gust H. Bjork, 2601 Parkview Blvd.,
Robbinsdale, Minn. 55422
Filed Sept. 29, 1969, Ser. No. 861,676
Int. Cl. F01n 3/10
U.S. Cl. 60—30                                    7 Claims

ABSTRACT OF THE DISCLOSURE

A pollution reducing muffler for internal combustion engines having a hollow tubular body having an exhaust gas inlet into one end and discharge from the other. The inlet end of the tubular body is desirably lined with foraminous material, such as metal screening. A noise reducing muffler may be attached to the discharge end. An aspirator connected to the breather tube of the crankcase of the engine is disposed in series between the gas inlet and discharge. The muffler reduces pollution by promoting further combustion of combustible constituents of the exhaust gases.

---

This invention relates to a system for the reduction of objectionable constituents in exhaust gases from internal combustion engines, such as automobile engines, engines for lift trucks and loaders, engines for plaster pumps, and the like. More particularly the invention relates to a muffler device for attachment to the exhaust manifold of an internal combustion engine for the reduction of the quantities of unburned hydrocarbons and carbon monoxide emitted from the exhaust system of the engine. The muffler of the present invention is especially useful for reducing air pollution from internal combustion engines used indoors, such as fork lift trucks in warehouses, industrial sweepers, plaster pumps, and the like.

The exhaust gases from the average automobile and similar internal combustion engines contain a mixture of carbon monoxide, carbon dioxide, unburned or partially burned hydrocarbons, nitrogen, some of the nitrogen oxides, and, under certain conditions, portions of unconsumed air. It is reasonably well established that these automobile exhaust gases and similar exhaust gases from other internal combustion engines contribute to the production of smog and other forms of air pollution. In certain urban areas air pollution exists to such an extent as to be considered objectionable and potentially harmful. As a result states have begun to legislate against the introduction into the atmosphere of gases which contribute to pollution of the atmosphere. Exemplary of this is legislation enacted in California which establishes a maximum permissible content of hydrocarbon in escaping automobile exhaust of 275 parts per million and maximum carbon monoxide content of 1.5 percent. More stringent requirements have been proposed by which maximum permissible hydrocarbon would be reduced to 180 p.p.m. and maximum carbon monoxide to 1.0 percent. The pollution problem is especially acute and potentially dangerous where an internal combustion engine is operated indoors, as on a fork lift truck in a warehouse.

Prior attempts to reduce the unburned hydrocarbon and carbon monoxide content in engine exhaust have principally been in the form of so-called "after burners" for direct oxidation of the undesired materials with excess air at high temperatures above about 2000° F. and catalytic converters for catalytically oxidizing the unwanted materials with excess air at lower temperatures of the order of 500° F. However, neither of these systems has proved completely satisfactory under the wide variety of operating conditions which must be met in the course of operation of an automobile or similar engine in normal use.

The principal object of this invention is to provide a simple muffler system for exhaust gases from internal combustion engines to effectively reduce the content of objectionable gaseous constituents.

The invention is illustrated by the accompanying drawings in which the same numerals refer to corresponding parts and in which:

FIG. 1 is an elevation, partly in section, of the muffler device according to the present invention;

FIG. 2 is a transverse section on the line 2—2 of FIG. 1 and in the direction of the arrows; and FIG. 3 is a transverse section on the line 3—3 of FIG. 1 and in the direction of the arrows.

Referring now to the drawings, the exhaust reducing muffler according to the present invention shown there, indicated generally at 10, includes a tubular body 11 which is preferably of generally circular cross section. The body 11 is threaded so as to be adapted to be connected to the exhaust manifold of an internal combustion engine or otherwise connected to receive engine exhaust. The opposite end of body 11 is threaded and connected to a T-fitting 12.

A foraminous tubular lining 13, such as fine mesh stainless steel screening, is provided within tubular body 11. As best seen in FIG. 3, screening 13 is coiled with two or more turns or thicknesses pressing outwardly against the inner tubular wall of the body. Desirably a flat segment 14 of the screening extends diametrically across the innermost layer and extends the length of the liner. The screening is held in place as by means of screw 15 extending through the body wall. The screen is desirably of fine mesh with about 30 to 50 openings per linear inch in both directions formed from 0.0075 to 0.012 inch wire.

The end of screw 15 may cause the screen 13 to bulge inwardly somewhat. Such a bulge functions as a turbulence creating element. Increased turbulence promotes the efficiency of the unit without creating back pressure.

The end 16 of T-fitting 12 opposite from the connection of the T-fitting with the tubular body 11 is the discharge from the muffler and is threaded for optional attachment to a noise reducing muffler. T-fitting 12 encloses an aspirating chamber 17 between spaced apart internal annular shoulders or flanges 18 at the inlet end of the fitting and 19 at the discharge end. Shoulder or flange 18 is provided with a plurality of longitudinally extending grooves or channels 20. A tubular aspirator element comprising a generally cylindrical inlet portion 22 and a cylindrical throat portion 23 of lesser diameter connected by an intermediate tapering wall portion 24 lies within the aspirating chamber 17. The inlet portion 22 of the aspirator is press fit or otherwise tightly connected within annular flange 18. Aspirator throat 23 is desirably offset relative to the inlet portion such that its downstream lip rests against the inner surface of annular flange 19, as shown.

The third port 25 into T-fitting 12 is disposed generally at a right angle to the longitudinal axis of the unit and communicates with the aspirating chamber 17. Port 25 is threaded to receive a pipe or tube 26. The opposite end of pipe 26 is connected through a series of reducing fittings 27–30 to a flexible tube 31 whose opposite end is provided with fittings 32–33 for attachment to the breather tube of the crankcase of the internal combustion engine with which the muffler device is to be used.

The hot exhaust gases from the engine enter the pollution reducing muffler passing through and around the fine mesh screen 13. The bulk of the exhaust gases pass through the aspirator inlet 22 of greater diameter, through the tapered portion of the aspirator and the throat 23 of reduced diameter. This creates a venturi effect and as the gases are discharged from the narrow throat of the aspirator, the reduced pressure in the aspirating chamber 17 causes gases to be drawn off from the crankcase through the tubing 31. These gases are subjected to the heated surface of the aspirator tube, heated by the exhaust gases, as the crankcase gases pass around the aspirator tube and out through the space between the end of the aspirator tube and flange 19 for admixture with the gases being discharged through the aspirator. A portion of the hot exhaust gases from body 11 pass into the aspirating chamber 17 through the grooves or channels 20 around the outside of the tubular aspirator.

The muffler body and fittings are desirably formed from copper or predominantly copper alloys capable of withstanding high temperatures. Although not desiring to be bound by any particular theory, it is believed that the reduction of pollutants is the result of combustion catalyzed by high temperature contact of the gases with the stainless steel foraminous lining and copper or copper alloy components of the unit with final combustion taking place at the discharge end of the muffler as the hot gases are contacted by atmospheric air. A muffler unit as described has a projected useful life of from 40,000 to 50,000 hours of operation. In field tests on lift trucks and loaders, total pollutants have been reduced to as little as 0.001 percent.

Although size is not a limitation on the invention, a typical muffler for use on a fork lift truck or the like has a body about 4 inches long with 1 inch inside diameter and a T-fitting about 3 inches long. Larger engines require proportionately larger mufflers.

It is apparent that many modifications and variations of this invention as hereinbefore set forth may be made without departing from the spirit and scope thereof.

The embodiments of the invention in which an exclusive property or privilege is claimed are defined as follows:

1. A pollution reducing muffler for an internal combustion engine comprising:
   (A) a hollow tubular body, one end of said body being an exhaust fume inlet;
   (B) a foraminous tubular lining disposed over the inside surfaces of said body, said foraminous tubular lining being metal screening coiled against the inside surface of the tubular body, said screening having at least two turns and the inside end of said screening being disposed to extend diametrically across said body;
   (C) a T-fitting downstream from said tubular body, said T-fitting having a chamber therein;
   (D) an exhaust discharge port from said T-fitting;
   (E) aspirator means in the exhaust gas flow path between the exhaust fume inlet and the discharge port; and
   (F) aspirating port means in said T-fitting communicating with said aspirator means.

2. A muffler according to claim 1 further characterized in that said body, T-fitting and aspirators are composed predominantly of copper and said foraminous lining is fine mesh stainless steel screening.

3. A muffler according to claim 1 further characterized in that said aspirator means comprises:
   (A) a tubular cylindrical inlet;
   (B) a constricted tubular throat of lesser diameter; and
   (C) a tapering interconnecting wall;
   (D) said aspirator inlet being fit into the upstream end of said T-fitting in communication with said tubular body;
   (E) the downstream end of said aspirator throat extending into the discharge port from said T-fitting; and
   (F) said aspirating port communicating with the chamber within said T-fitting between the aspirator inlet and downstream end of said throat.

4. A muffler according to claim 3 further characterized in that the ends of the chamber within said T-fitting are constricted by internally extending flanges, the inlet end of the aspirator means being tightly fit in the first of said flanges and the downstream end of said throat extending to said other flange.

5. A muffler according to claim 4 further characterized in that said first flange is provided with a plurality of spaced apart longitudinally extending channels for passage of a portion of exhaust gases around the outside of the aspirator inlet.

6. A muffler according to claim 4 further characterized in that said constricted throat is offset from the longitudinal centerline of said T-fitting and engages said other flange.

7. A muffler according to claim 1 further characterized in that said aspirating port is provided with fittings connecting flexible tubing whereby the aspirator port is adapted for connection to the crankcase breather tube of the internal combustion engine with which the muffler is used.

References Cited
UNITED STATES PATENTS

| | | | |
|---|---|---|---|
| 1,828,085 | 10/1931 | Syrovy | 60—30 |
| 3,166,895 | 1/1965 | Slayter | 60—30 |
| 3,197,955 | 8/1965 | Cohn | 60—30 |
| 3,263,412 | 8/1966 | Thompson | 60—30 |
| 3,279,168 | 10/1966 | Gerlach | 60—30 |
| 3,300,964 | 1/1967 | Knopp | 60—30 |
| 3,306,034 | 2/1967 | Boyd | 60—30 |
| 3,425,216 | 2/1969 | Bjork | 60—30 |

DOUGLAS HART, Primary Examiner

U.S. Cl. X.R.

23—277 C, 288 F; 181—43